(12) United States Patent
Blight et al.

(10) Patent No.: US 7,613,428 B2
(45) Date of Patent: Nov. 3, 2009

(54) RESOURCE LOCATION THROUGH LOCATION HISTORY

(75) Inventors: David C. Blight, Oceanside, CA (US); Elaine Lusher, Pleasanton, CA (US)

(73) Assignee: Palm, Inc., Sunnyvale, CA (US)

(*) Notice: Subject to any disclaimer, the term of this patent is extended or adjusted under 35 U.S.C. 154(b) by 61 days.

(21) Appl. No.: 11/809,198

(22) Filed: May 31, 2007

(65) Prior Publication Data
US 2007/0298715 A1 Dec. 27, 2007

Related U.S. Application Data

(63) Continuation of application No. 11/540,909, filed on Sep. 29, 2006, which is a continuation of application No. 09/870,311, filed on May 30, 2001, now Pat. No. 7,266,379.

(51) Int. Cl.
H04B 7/00 (2006.01)

(52) U.S. Cl. .............. 455/41.2; 455/41.1; 455/456.1; 455/67.11; 455/432.1; 455/432.3

(58) Field of Classification Search ............ 455/41.2, 455/41.1, 456.1, 67.11, 432.1; 701/211, 701/213, 208; 342/457, 450, 463, 464
See application file for complete search history.

(56) References Cited

U.S. PATENT DOCUMENTS

| | | | |
|---|---|---|---|
| 5,010,547 A | 4/1991 | Johnson et al. |
| 5,012,219 A | 4/1991 | Henry |
| 5,075,684 A | 12/1991 | DeLuca |
| 5,359,317 A | 10/1994 | Gomez et al. |
| 5,394,140 A | 2/1995 | Wong et al. |
| 5,430,436 A | 7/1995 | Fennell |
| 5,594,796 A | 1/1997 | Grube et al. |
| 5,612,682 A | 3/1997 | DeLuca et al. |
| 5,650,776 A | 7/1997 | Mitchell et al. |
| 5,699,244 A | 12/1997 | Clark, Jr. et al. |
| 5,705,995 A | 1/1998 | Laflin et al. |
| 5,850,187 A | 12/1998 | Carrender et al. |
| 5,875,434 A | 2/1999 | Matsuoka et al. |
| 5,903,852 A | 5/1999 | Schaupp, Jr. et al. |
| 5,929,848 A | 7/1999 | Albukerk et al. |
| 5,938,721 A | 8/1999 | Dussell et al. |
| 5,958,006 A | 9/1999 | Eggleston et al. |
| 6,016,476 A | 1/2000 | Maes et al. |
| 6,047,579 A | 4/2000 | Schmitz |
| 6,104,291 A | 8/2000 | Beauvillier et al. |
| 6,157,630 A | 12/2000 | Adler et al. |
| 6,177,905 B1 | 1/2001 | Welch |
| 6,182,010 B1 * | 1/2001 | Berstis .................. 701/211 |

(Continued)

OTHER PUBLICATIONS

"New Riverside University Dictionary", published by *The Riverside Publishing Company*, Copyright © 1984 by Houghton Mifflin Company, p. 81.

(Continued)

*Primary Examiner*—Sanh D Phu
(74) *Attorney, Agent, or Firm*—Foley & Lardner LLP

(57) ABSTRACT

A system and method are disclosed for locating resources available to portable electronic devices which are enabled for short range wireless communications. The system and method include creating and accessing a resource and access location history database accessible via the portable electronic device.

22 Claims, 3 Drawing Sheets

U.S. PATENT DOCUMENTS

| | | | |
|---|---|---|---|
| 6,182,221 B1 | 1/2001 | Hsu et al. | |
| 6,243,689 B1 | 6/2001 | Norton | |
| 6,246,376 B1 | 6/2001 | Bork et al. | |
| 6,259,405 B1 * | 7/2001 | Stewart et al. | 342/457 |
| 6,297,737 B1 | 10/2001 | Irvin | |
| 6,307,919 B1 | 10/2001 | Yoked | |
| 6,313,745 B1 | 11/2001 | Suzuki | |
| 6,346,881 B1 | 2/2002 | Davidson | |
| 6,389,290 B1 | 5/2002 | Kikinis et al. | |
| 6,404,761 B1 | 6/2002 | Snelling et al. | |
| 6,424,845 B1 | 7/2002 | Emmoft et al. | |
| 6,456,234 B1 * | 9/2002 | Johnson | 342/357.09 |
| 6,487,180 B1 | 11/2002 | Borgstahl et al. | |
| 6,542,750 B2 | 4/2003 | Hendrey et al. | |
| 6,601,093 B1 | 7/2003 | Peters | |
| 6,681,108 B1 | 1/2004 | Terry et al. | |
| 6,757,718 B1 | 6/2004 | Halverson et al. | |
| 6,772,331 B1 | 8/2004 | Hind et al. | |
| 6,832,178 B1 | 12/2004 | Fernandez et al. | |
| 6,847,823 B2 | 1/2005 | Lehikoinen et al. | |
| 6,907,134 B1 | 6/2005 | Yamada et al. | |
| 6,934,664 B1 | 8/2005 | Webb et al. | |
| 6,941,270 B1 | 9/2005 | Hannula | |
| 6,982,962 B1 | 1/2006 | Lunsford et al. | |
| 7,266,379 B2 | 9/2007 | Blight et al. | |
| 7,360,248 B1 * | 4/2008 | Kanevsky et al. | 726/21 |
| 2002/0010617 A1 | 1/2002 | Hamaguchi et al. | |
| 2002/0019584 A1 | 2/2002 | Schulze et al. | |
| 2002/0061031 A1 | 5/2002 | Sugar et al. | |
| 2002/0078075 A1 | 6/2002 | Colson et al. | |
| 2002/0136184 A1 | 9/2002 | Liang et al. | |
| 2002/0147717 A1 | 10/2002 | Barros et al. | |
| 2002/0184331 A1 | 12/2002 | Blight et al. | |
| 2002/0184418 A1 | 12/2002 | Blight | |
| 2002/0194498 A1 | 12/2002 | Blight et al. | |
| 2006/0095348 A1 | 5/2006 | Jones et al. | |

OTHER PUBLICATIONS

*Skyhook Wireless*, "How It Works", printed from internet address: http://developer.skyhookwireless.com/how-it-works/, on Apr. 12, 2007, 2 pages.

U.S. Appl. No. 11/823,850, filed Jun. 28, 2007, Kammer.

U.S. Appl. No. 11/706,872, filed Feb. 15, 2007, Wong et al.

U.S. Appl. No. 11/540,909, filed Sep. 29, 2006, Blight et al.

U.S. Appl. No. 10/006,952, filed Nov. 5, 2001, Kammer.

Palm™ m505 Handheld, printed from internet address: http:/www.palm.com/products/palmm505/ on Sep. 20, 2001 (5 views).

* cited by examiner

RESOURCE LOCATION THROUGH LOCATION HISTORY

CROSS-REFERENCE TO RELATED APPLICATION

This application is a continuation of U.S. application Ser. No. 11/540,909 filed Sep. 29,2006 which is a continuation of U.S. application Ser. No. 09/870,311 filed May 30,2001 now U.S. Pat. No. 7,266,379, both of which are herein incorporated by reference in their entireties

BACKGROUND

Handheld computing devices, "palmtops," "palmhelds," personal digital assistants (PDAs), or handheld computers typically weigh less than a pound and fit in a pocket. These handhelds generally provide combination of personal information management, database functions, word processing, and spreadsheets as well as voice memo recording, wireless e-mail, and wireless telephony functions.

Handheld computers may include hardware modules which allow a user to access and communicate wirelessly with both wired and wireless communications networks. Such networks may include Local Area Networks (LANs) and Personal Area Networks (PANs).

Technologies such as Bluetooth and IEEE 802.11 provide a means to connect mobile devices to a communications network, however they do not specifically address many problems that need to be solved to provide a preferred user experience.

One of the main difficulties of short range wireless devices such as Bluetooth or 802.11 is that the coverage area of each transmitter is relatively small. Short range wireless technology enables Personal Area Networks (PAN) in which small network is formed sharing resources localized space. PANs are extremely effective for adhoc networks with stationary components (for example an office), or where all components move together (cell phone, PDA, and other mobile devices all attached to a user). A major difficulty of PAN technology is the interaction of mobile and stationary devices. In conventional systems, users of mobile devices do not maintain any records relating to the location of wireless access points or wirelessly enabled devices. Further, mobile devices are not configured to maintain records of the location of access points to gain access to various resources.

Accordingly, there is a need for a mobile device that is configured to record the location of access points and available resources associated with that location as it moves around. There is also a need for a mobile device that accesses a database when a resource is needed, which is no longer accessible at the mobile devices current location, and the mobile device is informed of one or more locations where the resource is available. Further, there is a need for a navigation application that may be used to direct the mobile device to a location where a particular resource is available.

Accordingly, it would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a system for locating access to wireless resources. The system includes a portable electronic device including a short range radio frequency (RF) transceiver. The system also includes a database program running on the portable electronic device, the database program is configured to store a history of wireless station information and available resource information, the wireless station information is representative of wireless stations coming in communications with the short range RF transceiver as the portable electronic device is being moved through an environment, and the available resource information is correlated with the wireless station information and the available resource information is representative of the resources available through the wireless stations.

Another exemplary embodiment relates to a method of locating access to resources in an environment. The method includes roaming within an environment with a portable electronic device having a short range radio frequency (RF) transceiver. The method also includes scanning for wireless enabled devices within range of the RF transceiver of the portable device. Further, the method includes storing wireless station information relating to the wireless enabled devices in a database, and storing available resource information relating to the resources available through the wireless station in the database. Further still, the method relates to accessing, on the portable electronic device, the database including the wireless station information and the available resource information.

Yet another exemplary embodiment relates to a method of locating access to resources in an environment. The method includes moving through an environment with a portable electronic device having a short range radio frequency (RF) transceiver. The method also includes receiving information relating to wirelessly accessible resources. Further, the method includes storing the information in a database on the device, and accessing the database information according to a specific query.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
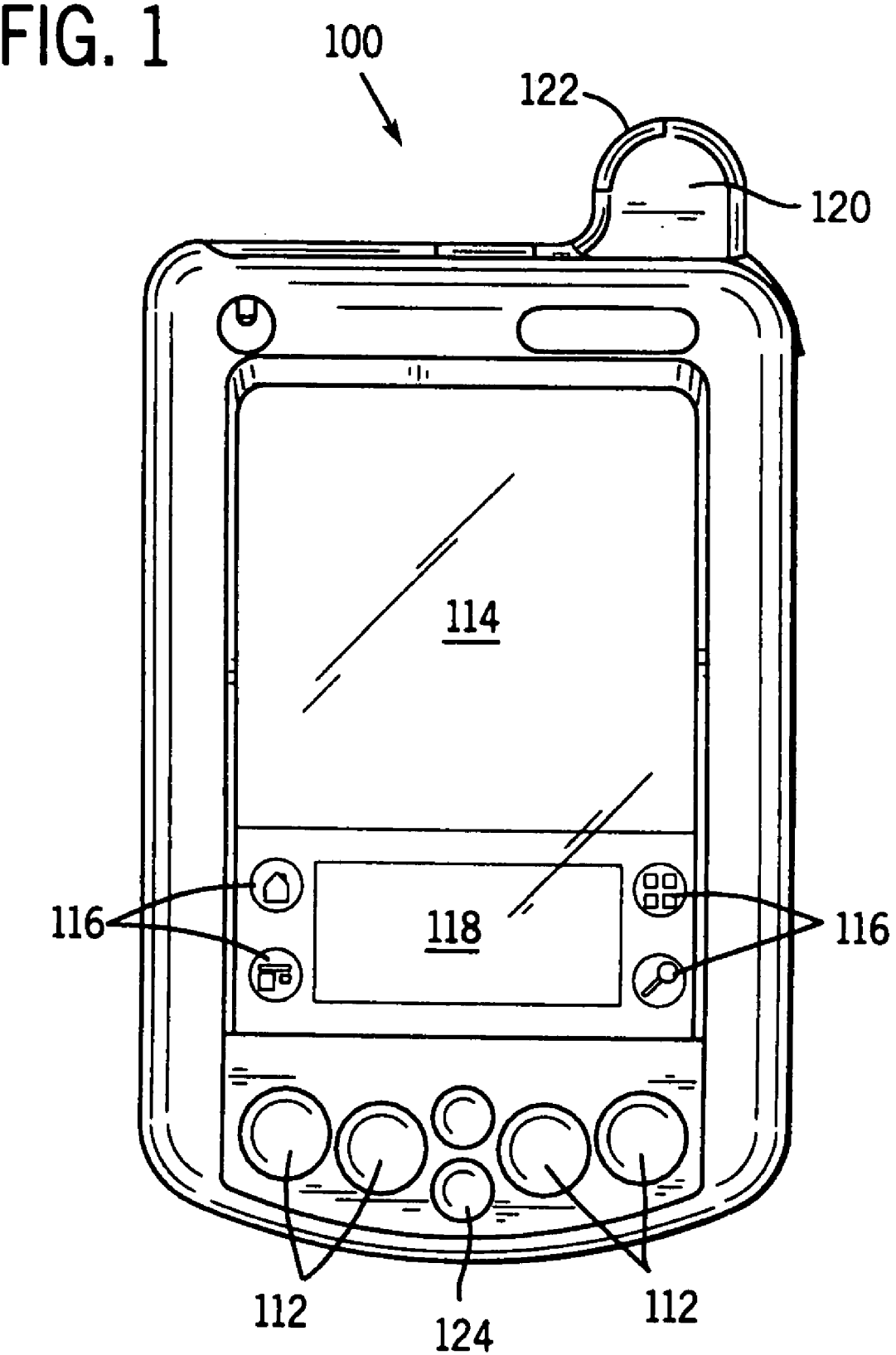
FIG. 1 is an exemplary front elevation view of a handheld computer.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, pagers, and other mobile computing devices.

Preferably, handheld computer 100 includes interactive hardware and software that performs functions such as maintaining calendars, phone lists, task lists, note pads, calculator applications, spreadsheets, games, video files, and other applications capable of running on a computing device. Further, handheld computer 100 may be configured for such functions as voice memo recording and playback as well as communications network connectivity, Internet connectivity, wireless messaging, e-mail, always-on e-mail, and wireless telephony.

Handheld computer 100, depicted in FIG. 1, includes a plurality of input function keys 112 and a display 114 having graphical user interface features. Display 114 may be provided with a touch screen interface that allows a user to select and alter displayed content using a pointer, such as but not limited to a stylus, a pen tip, a fingertip, or other pointing devices.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions may be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communications signals using an RF transceiver. Antenna 120 may further include an indicator light 122 integrated into antenna 120 for indicating the transmission and reception of wireless communication signals. Further, light 122 may be used to indicate other states of handheld computer 100. Further, handheld computer 100 may include a wireless transceiver, such as a Bluetooth transceiver or an IEEE 802.11 standard transceiver, or other RF or wireless transceiver, such that handheld computer 100 is configured to communicate with other nearby devices and/or access points to a communications link.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

In an exemplary embodiment, a system is used to store information about wireless resources detected through short range wireless technologies such as IEEE 802.11 or Bluetooth. Such a system may be a part of providing a preferred user experience in using portable electronic devices with access to wirelessly accessible resources. The ability to locate wireless services which are nearby may be important in areas with spotty coverage, or multiple short range resources. For example, such environments include, but are not limited to an office environment (see FIG. 2), a corporate or academic campus environment, a shopping mall or shopping area environment or a metropolitan area (see FIG. 3).

In order to enable such a system which provides wireless accessibility to various resources, and stores the information in a database on the portable device, a preferred embodiment may maintain the following:

1. The system may work with any location determinization method including (but not limited to):
   a. Global Positioning System (GPS)
   b. Network enhanced GPS
   c. Base station proximity
   d. Triangulation
   e. Time difference
   f. And others
2. The system may be technology independent (i.e., work with Bluetooth, 802.11, or any other short range wireless technology)
3. Filtering of resources may be supported.
4. Compression of recorded information.
5. Removal of old records.
6. Detection of moved resources.
7. The system may be able to work with different radio characteristics (signal strength, antennas, sensitivity).
8. The system may be able to work with a map system, to provide navigation.

Figure 2:
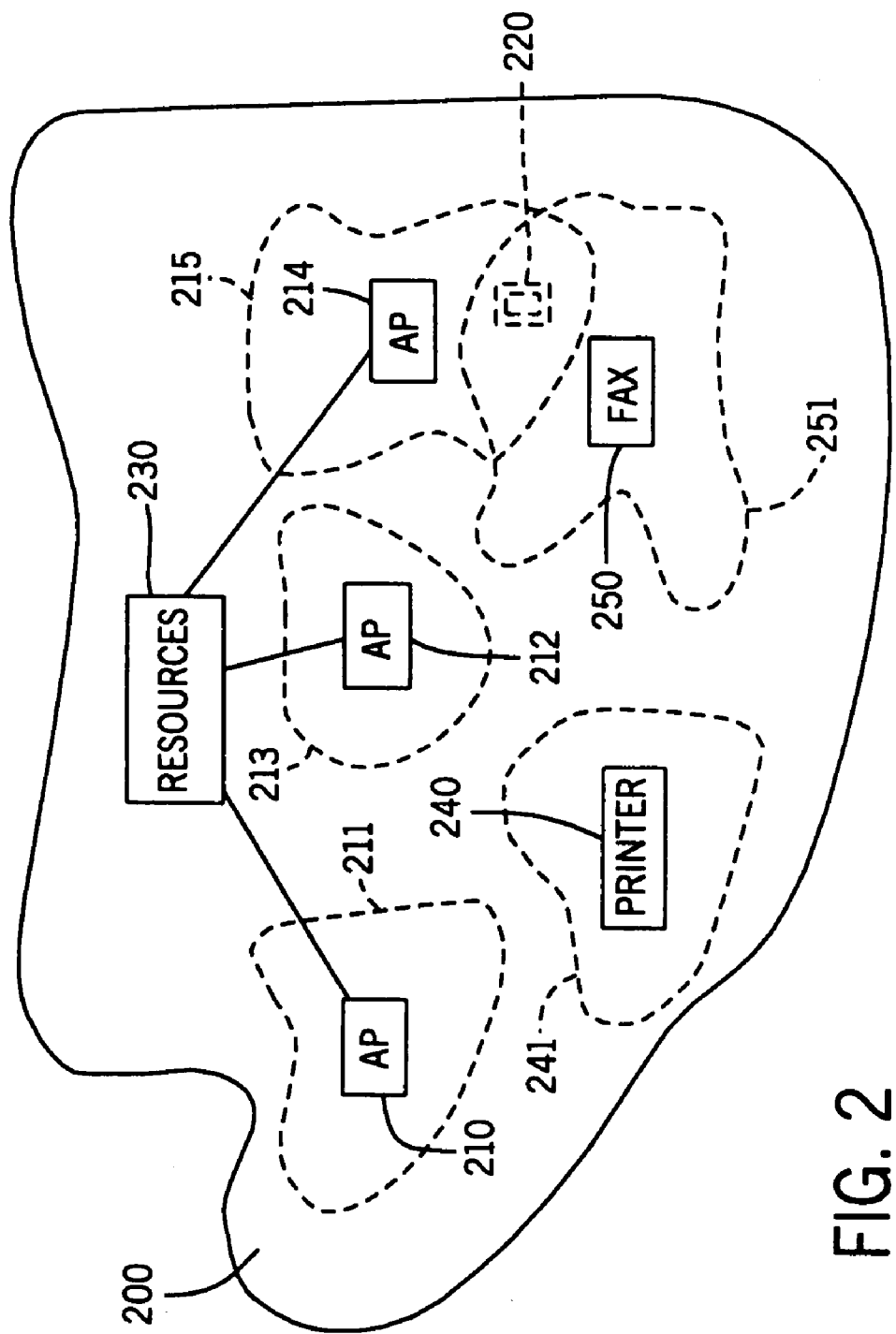
FIG. 2 is an exemplary schematic diagram of an environment including wirelessly accessible resources.

Referring now to FIG. 2, a general environment 200 is depicted. Environment 200 includes a plurality of wirelessly accessible devices, including, but not limited to access points 210, 212 and 214. Each of access points 210, 212 and 214 have a coverage region 211, 213, and 215 associated respectively therewith. Coverage areas 211, 213 and 215 are areas in which a device, such as a portable electronic device 220 equipped with a wireless transceiver, such as but not limited to an IEEE 802.11 or Bluetooth transceiver, is able to communicate with the access point which also includes a compatible transceiver (or transmitter) therein. Access points (APs) 210, 212, and 214 may be coupled to any of a plurality of resources generally depicted as resources 230. Resources 230 may be any of a variety of types of information resources, such as, but not limited to access to a communications network, the Internet, an Intranet, a local area network (LAN), a single computer having information stored thereon, and the like. Access points 210, 212, and 214 may be coupled to the same resources 230 or alternatively may be coupled to different and separate resources. Further, other devices within environment 200 may exist, for example, a printer 240, a fax machine 250, and various other types of devices having wireless access. Each of devices 240 and 250 include their respective wireless coverage areas 241 and 251, respectively. In an exemplary embodiment, portable device 220, which may be, but are not limited to, a handheld computer, a laptop computer, a cellular telephone, or any of a variety of other portable electronic devices, include a database of resources and their locations.

The database stores information associated with both wireless stations (wireless transmitter) detected (such as APs 210, 212, 214, printer 240, FAX 280, etc.), and resources (such as resources 230, printer 240, FAX 250, etc.) available through wireless stations. Any specific wireless station may have multiple resources associated with it, and likewise each resource may be available through multiple wireless stations (see, e.g., FIG. 2). In an exemplary embodiment, the following information, among other possible information, may be in the database:

Wireless station information
    Wireless technology (Bluetooth, 802.11, etc.)
    Address (MAC address)
    Location information
        Location
        Error
        Location determination method
    Resources associated with wireless station
    Timestamp (last detection)
Resource information
    Resource identifier
    Resource description. This description is used to describe the resource. It may be used in searching for particular resources.
    Keywords
    Attributes in an object oriented data description
    Tags Associated wireless stations Timestamp (last detection)

The location of a wireless station is an important part of the database. One important issue is the resolution of measurements in the system, and the location determination. If the resolution is too fine grain, the database may become two large, and the coverage areas disjoint. If the resolution is too coarse, the results may be ambiguous and not useful. Accordingly, the following characteristics may be considered in developing the system:

Location accuracy

Variance in signal strengths (or coverage areas) of mobile devices.

The physical environment

A typical measurement may include:

Location

Signal strength

Resources.

In an exemplary embodiment, there may be multiple ways in which the location information may be stored, including but not limited to the following:

Store all recorded measurements. This is the simplest solution, but is not practical for reasons of memory requirements, and slow/complex searching algorithms.

Store estimated location of wireless stations and radius of coverage. This allows us only to store where the wireless station is thought to be. The aggregate x, y, z values are used to allow additional measurements to be inserted. No signal strength is used or stored.

Point and radius

Number of measurements

Aggregate x, y, x coordinates

Boundary of coverage area. Allows for non-symmetrical radiation patterns to be considered which may be significant for many environments. Requires more complex searching algorithms.

Polygon. The polygon represents a non-circular (or spherical) coverage area. The shape of the polygon is determined by analysis of multiple measurements.

When a resource is desired by a user of a portable device, such as device 220, a user initiates a query or a search for the desired resource accessible within environment 200. The search algorithm is responsible for finding the closest resource station to mobile device's 220 current location. An exemplary input and output to a query may include but is not limited to the following:

Input:

Current location (may be supplied automatically via any number of locating mechanisms, such as but not limited to GPS)

Desired resource

Preferences (optional)

Selection criteria

Closest, last encountered, etc.

Output:

Location where resources can be accessed

Algorithm:

Search through the database and find a location where the specified resource may be accessed. This involved first matching the specified resource with those in the database. The matches are then compared to find the closest (or other selection criteria). Further other searching and matching algorithms may be used.

In a particular exemplary embodiment, the database collecting information may become too large for a memory limited mobile device (such as a handheld computer). Methods to account for a large database include, but are not limited to the following:

Compressing the database (discussed above)

Removing entries. Filtering out less likely to be queried resources. Also filtering out similar entries (e.g., discard additional color printers once one is located)

Filtering based on user preferences

Splitting the database. Splitting the database into regions based on geography. Does not reduce memory consumptions, but makes database more manageable.

Storing the database off device. The database (or certain entries) could be removed from the memory of the mobile device and placed in secondary memory (attached memory cards, disks, etc), or stored on a network based memory (database or entries transferred through wireless network to a remote sites.

Further, in an exemplary embodiment it may also be possible for the mobile device user to specify filters used in recording information and resources. The filters may be used to reduce the amount of information stored.

In order to save storage space on the handheld device or related storage medium continuous and/or periodic database maintenance may be desired. For example, in a preferred exemplary embodiment database maintenance is carried out by removing records from the database. Records from the database may be removed when:

They expire. The timestamp is past a user specified retention time.

The wireless station moves. When a recording shows no wireless station is present, where it once was detected, the record may be removed.

The resource is no longer available. When the mobile device detects that a resource is no longer available through a still present wireless station.

The mobile user requests manual deletion.

A wireless station is detected where it was not present before.

Consider a mobile device 220 within an office complex generally represented by environment 200 of FIG. 2. The mobile device may have a Bluetooth transceiver in it. The mobile device is continually scanning for other Bluetooth devices.

When another Bluetooth device is detected (e.g., printer 240) the device is queried using a service discovery protocol to see what resources are available. The following information may be recorded: current location, MAC address of detected device/BT identifier, and a list of available resources at this location. The recorded information is then added to the history database including an entry made for printer 240 and current location of printer 240 is added.

When the mobile device moves out of range of printer 240, the following information is recorded: current location, a MAC address of detected device, and a list of available resources at this location. The recorded information is added to the history database. The history database information associated with printer 240 is analyzed.

When mobile device 220 is queried for the location of a printer, the history database is queried for a location of a printer, and the current location is supplied. The history database responds with a location matching the preferences (in this case defaults, closest physical). The history database may open up a graphical navigation tool to direct the mobile device to the resource location. The navigational tool may be a complex mapping system or a simple bit map based diagram with relative locations superimposed or further may be a stated location or a textual listing of directions.

In an exemplary embodiment, the mobile user may wish to save the database for future use (this could bean automatic process or manual). When he moves to a new environment, a new database is created. When he returns to a previously visited environment, he may reload the database to be reminded where resources were available.

In another exemplary use of the invention, a mobile device may be turned on for the first time in a corporate and/or academic campus. When in range of a Bluetooth access point, a mobile device may download a database from the network with location of services identified. The user would thus not need to roam around to find resources. If the user needs a printer, he may use the downloaded database to find the closest resource. If, however, a new resource is found, the database may be augmented. If a resource is discovered missing, it may be removed form the database. The removal may not be immediate, depending upon the stability of the environment.

Figure 3:
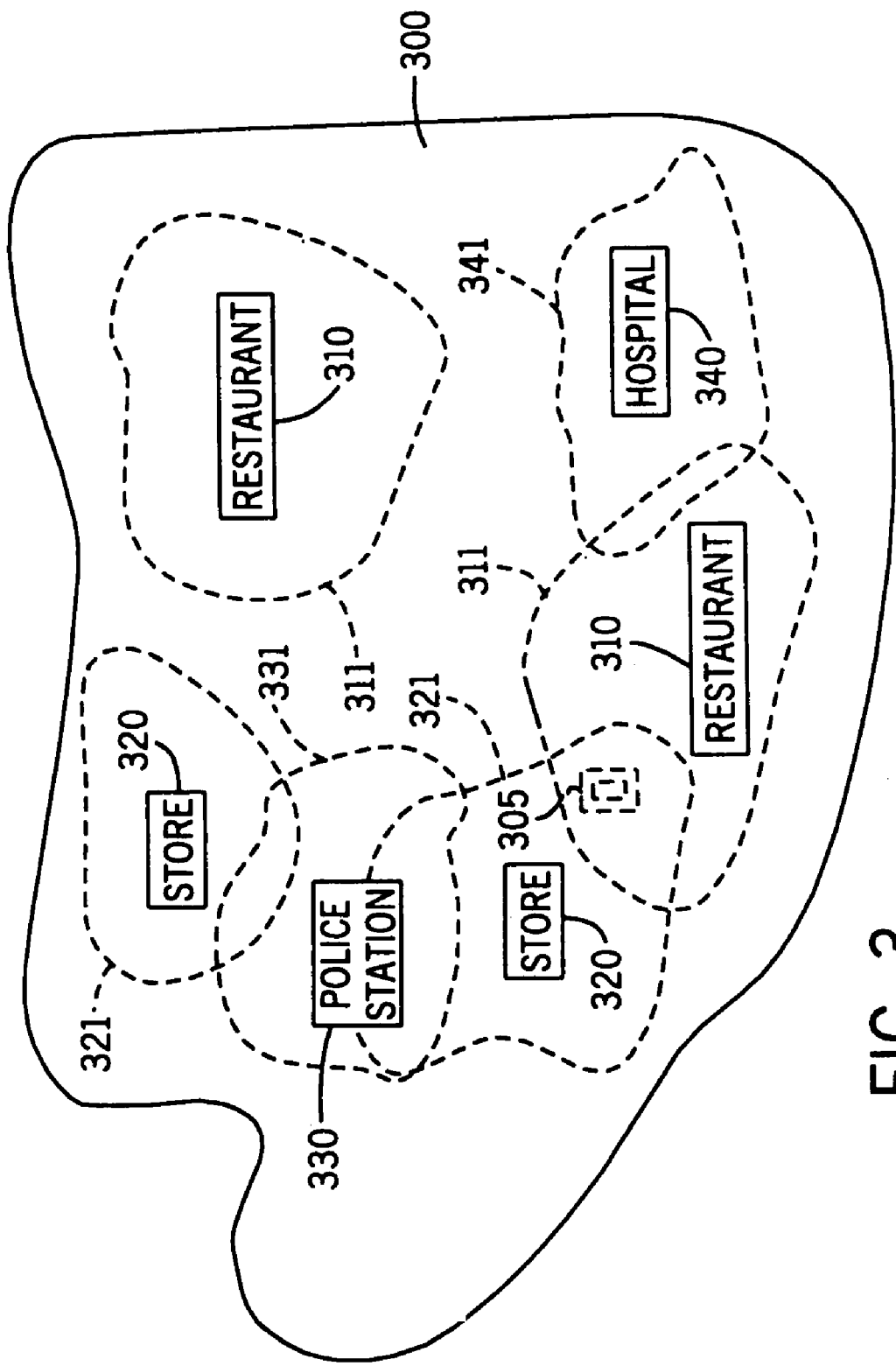
FIG. 3 is an exemplary schematic diagram of a metropolitan environment including areas of wireless accessibility.

In a further exemplary embodiment, a metropolitan area 300 is depicted in FIG. 3. Metropolitan area 300 includes a plurality of commercial and civic entities, including but not limited to restaurants 310 having coverage areas 311, stores 320 having coverage areas 321, police station 330 having coverage area 331, and hospital 340 having coverage area 341. A mobile device 305 may be moving through metropolitan area 300. As device 305 travels it occasionally picks up information from the local commercial and/or civic entities (stores 320, restaurants 310, etc.). Mobile device 305 may wish to not only record that a Bluetooth information source was found, but what type of enterprise it is, and what they sell or what services they provide. For example the following info could be recorded:

Restaurant: Location and any information about the menu that was available.

Store: Type and some items for sale.

Later, the mobile device 305 user may want to query for a restaurant. The database on the mobile device 305 may be queried for any restaurants that were found nearby (and optionally for certain types of food). Further, other queries may be made for example for particular services, i.e., is there a nearby hospital having emergency services, is there a nearby police station? In a similar implementation, the mobile device may be used in a shopping center or mall in which specific stores have access to resources such as but not limited to advertising, sales information, store hours, and the like. The location of access to such information may be stored in the database as described above.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A computing device, comprising:
    a radio frequency transceiver configured to detect a plurality of nearby wireless local area network access points;
    a location determination circuit; and
    a processing circuit configured to receive an address via the radio frequency transceiver from each of the detected plurality of nearby access points, to provide a location of each of the access points based on signals from the location determination circuit, and to store the addresses and associated locations in a database.

2. The computing device of claim 1, wherein the radio frequency transceiver operates according to an IEEE 802.11 standard and the addresses are MAC addresses.

3. The computing device of claim 1, wherein the location determination circuit comprises a global positioning system receiver.

4. The computing device of claim 1, wherein the location determination circuit is configured to triangulate the location of the access points.

5. The computing device of claim 1, wherein the processing circuit is configured to provide signal strengths of signals received from the access points.

6. The computing device of claim 5, wherein the processing circuit is configured to store a timestamp of detection of the nearby access points.

7. The computing device of claim 1, wherein the processing circuit is configured to compress the addresses and associated locations in the database.

8. The computing device of claim 1, further comprising the database, wherein the database is coupled to the computing device.

9. The computing device of claim 1, wherein the computing device is configured to transmit the addresses and associated locations through a wireless network to a remote site.

10. A method, comprising:
    detecting wireless local area network access points using a radio frequency transceiver;
    receiving address data from each of the detected access point via the radio frequency transceiver;
    calculating location data for the access points using a location determination circuit; and
    storing the location data and associated address data in a database.

11. The method of claim 10, wherein the step of detecting comprises receiving signals according to an IEEE 802.11 standard and wherein the address data comprises MAC addresses.

12. The method of claim 10, wherein the step of calculating location data comprises receiving signals from global positioning system satellites.

13. The method of claim 10, wherein the step of calculating location data comprises triangulating a location.

14. The method of claim 10, further comprising calculating signal strengths of signals received from the access points.

15. The method of claim 10, further comprising storing timestamps based on times of detection of the wireless access points.

16. The method of claim 10, further comprising compressing the addresses and associated locations in the database.

17. The method of claim 10, further comprising storing the database of location data and associated address data on a network-based memory.

18. A mobile computing device configured to query a database generated by:
    detecting wireless local area network access points using a radio frequency transceiver;

receiving address data from each of the detected access point via the radio frequency transceiver calculating location data for the access points using a location determination circuit; and storing the location data and associated address data in a database.

19. The mobile computing device of claim 18, further comprising a mobile telephony circuit.

20. The mobile computing device of claim 18, further comprising a housing configured to be carried in a hand during use.

21. The mobile computing device of claim 18, wherein the mobile computing device is configured to query the database for location data.

22. The mobile computing device of claim 21, wherein the mobile computing device is configured to display the location data on a graphical navigation tool.

* * * * *